United States Patent
Katiba et al.

(10) Patent No.: US 8,878,663 B2
(45) Date of Patent: Nov. 4, 2014

(54) AUTOMATIC SENSOR DETECTION

(71) Applicant: Ford Global Technologies, LLC, Dearborn, MI (US)

(72) Inventors: Mohsen Katiba, Dearborn, MI (US); Dilip B. Patel, Novi, MI (US); Greg Swadling, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 13/752,614

(22) Filed: Jan. 29, 2013

(65) Prior Publication Data

US 2014/0210606 A1    Jul. 31, 2014

(51) Int. Cl.
*B60C 23/00* (2006.01)
*B60C 23/02* (2006.01)

(52) U.S. Cl.
CPC ...................................... *B60C 23/02* (2013.01)
USPC ........ 340/447; 340/686.1; 340/442; 340/449; 340/539.1; 73/146; 73/146.4

(58) Field of Classification Search
USPC ........... 340/442, 447, 626, 686.1, 449, 539.1; 701/29.1, 1; 709/208; 73/146, 146.3
See application file for complete search history.

(56) References Cited

U.S. PATENT DOCUMENTS

| | | | |
|---|---|---|---|
| 4,734,674 A | 3/1988 | Thomas et al. | |
| 5,612,671 A | 3/1997 | Mendez et al. | |
| 6,018,993 A | 2/2000 | Normann et al. | |
| 6,218,937 B1 | 4/2001 | Delaporte | |
| 6,292,096 B1 | 9/2001 | Munch et al. | |
| 6,622,552 B1 | 9/2003 | Delaporte | |
| 6,731,205 B2 | 5/2004 | Schofield et al. | |
| 6,745,624 B2 | 6/2004 | Porter et al. | |
| 6,864,785 B2 | 3/2005 | Marguet et al. | |
| 6,879,252 B2 | 4/2005 | DeZorzi et al. | |
| 6,967,570 B2 | 11/2005 | Tsuji et al. | |
| 7,010,968 B2 | 3/2006 | Stewart et al. | |
| 7,111,508 B2 | 9/2006 | Desai | |
| 7,173,520 B2 | 2/2007 | Desai et al. | |
| 7,224,269 B2 * | 5/2007 | Miller et al. | 340/444 |
| 7,271,709 B2 | 9/2007 | Miller et al. | |
| 8,115,613 B2 * | 2/2012 | Patel et al. | 340/447 |

(Continued)

FOREIGN PATENT DOCUMENTS

| | | |
|---|---|---|
| CN | 102700368 A | 10/2012 |
| JP | 2012218672 A1 | 11/2012 |
| KR | 20090006377 A | 1/2009 |

OTHER PUBLICATIONS

Burgess, Freescale Tire Pressure Monitor System Demo, Freescale Semiconductor Application Note, AN1951, Rev 2, Jun. 2005, Freescale Semiconductor, Inc., US.

*Primary Examiner* — Hoi Lau
(74) *Attorney, Agent, or Firm* — Raymond L. Coppiellie; Bejin Bieneman PLC

(57) ABSTRACT

Frames of data are received. Each frame includes at least a sensor identifier and a changeable data field and is sent from one of a plurality of sensors. Each of the plurality of sensors is associated with a respective one of a plurality of sensor identifiers. The changeable data field includes, in some of the frames, data representing a sensed condition and, in others of the frames, counter data. The counter data is analyzed to determine whether any of the sensor identifiers can be associated with one of a plurality of sensor locations.

17 Claims, 5 Drawing Sheets

(56) References Cited

U.S. PATENT DOCUMENTS

| | | |
|---|---|---|
| 8,144,023 B2 * | 3/2012 | Watabe .................. 340/626 |
| 2002/0067285 A1 | 6/2002 | Lill |
| 2003/0016126 A1 * | 1/2003 | Katou .................... 340/442 |
| 2003/0156025 A1 * | 8/2003 | Okubo .................... 340/447 |
| 2003/0197603 A1 * | 10/2003 | Stewart et al. ............ 340/442 |
| 2005/0134446 A1 * | 6/2005 | Stewart et al. ............ 340/447 |
| 2005/0179530 A1 * | 8/2005 | Stewart et al. ............ 340/447 |
| 2005/0275517 A1 | 12/2005 | Tsukamoto et al. |
| 2006/0017554 A1 | 1/2006 | Stewart et al. |
| 2006/0020372 A1 | 1/2006 | Watabe |
| 2006/0158324 A1 | 7/2006 | Kramer |
| 2006/0259214 A1 | 11/2006 | McQuade |
| 2007/0009028 A1 | 1/2007 | Lee et al. |
| 2007/0144639 A1 | 6/2007 | Oh |
| 2007/0200693 A1 * | 8/2007 | Costes ................... 340/447 |
| 2007/0271014 A1 | 11/2007 | Breed |
| 2009/0058626 A1 * | 3/2009 | Watabe .................. 340/447 |
| 2010/0013618 A1 * | 1/2010 | Patel et al. ............... 340/447 |
| 2010/0148949 A1 | 6/2010 | McQuade et al. |
| 2014/0088816 A1 * | 3/2014 | Shima et al. ............. 701/29.1 |

* cited by examiner

AUTOMATIC SENSOR DETECTION

BACKGROUND

Various types of sensing systems may use new and/or replacement sensors from time to time. For example, pressure sensing systems for monitoring the pressure within the tires of a vehicle generate a pressure signal using an electromagnetic signal, which is transmitted to a receiver. The pressure signal may be correlated to the pressure within a tire. When the tire pressure monitoring system detects a low pressure situation, the vehicle operator is directed to remedy the problem. Such problems are remedied by replacing the low tire with a spare tire, or filling the low tire to increase the pressure therein.

On occasion, new sensors may be installed in a sensor system, e.g., in a tire pressure monitoring system in a vehicle. The sensors generally need to be associated to a receiver in the vehicle so that the receiver can monitor the correct sensors. In the event the new sensor is not properly associated, the receiver will not recognize the sensor and will generally flag a fault, typically including providing an indicator to the vehicle operator. The fault signal results in customer dissatisfaction and warranty in the field to recognize and repair the problem.

Auto learn functions have been applied to associate the various tire pressure sensor monitors with the locations of the tires in the vehicle. However, many approaches have been known to incorrectly associate a sensor on a vehicle, and may even introduce the potential of incorrectly associating a sensor from a nearby vehicle. Further, existing auto learn systems suffer from the drawback of requiring unduly long periods of time to identify a sensor.

DESCRIPTION OF INVENTION

In the following figures, the same reference numbers will be used to illustrate the same components. It should be understood that various of the components set forth herein may be changed.

Figure 1:
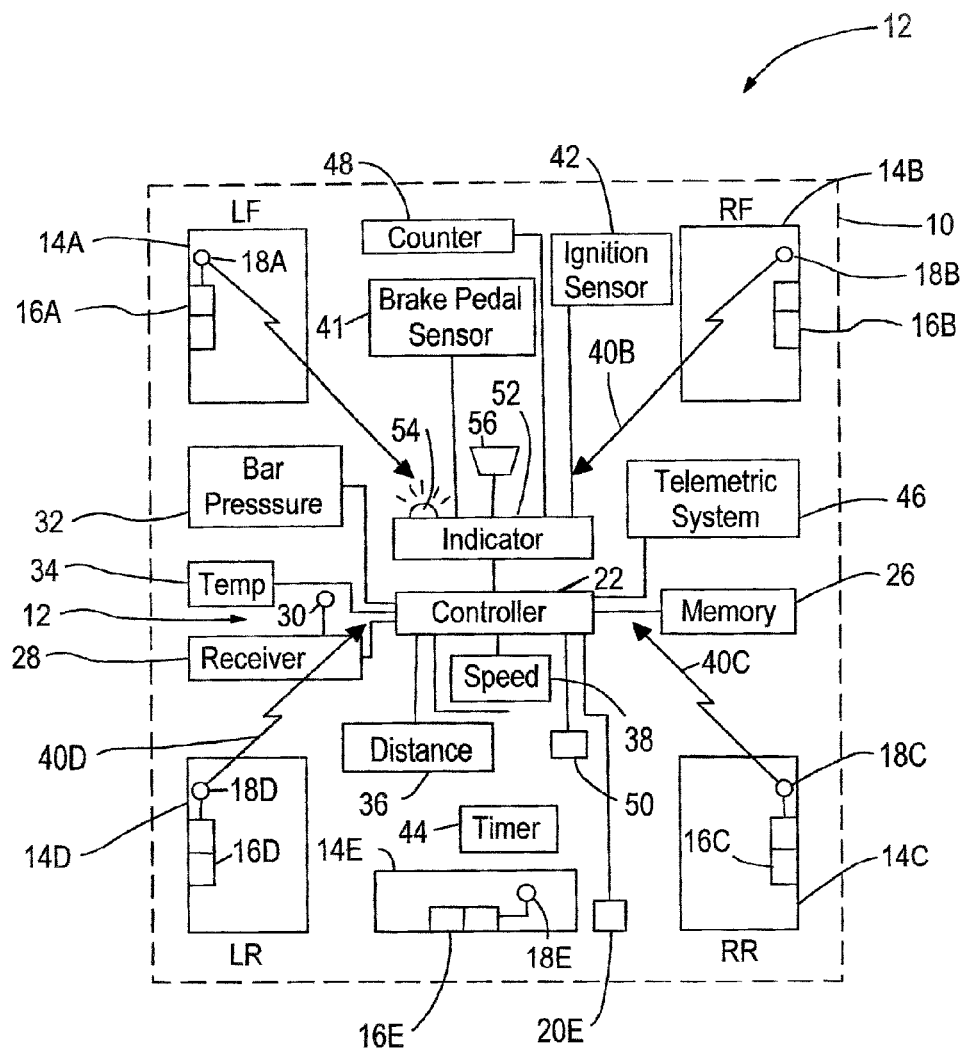
FIG. 1 is a block diagram of an exemplary tire pressure monitoring system.

With reference to FIG. 1, a tire pressure monitoring system 12 is shown for monitoring the air pressure within a left front tire 14A, a right front tire 14B, a right rear tire 14C and a left rear tire 14D. Each tire 14A-14D has a respective tire pressure sensor module 16A, 16B, 16C, and 16D. Each sensor module 16A-16D (sometimes referred to herein as sensors 16) has a respective antenna 18A, 18B, 18C and 18D. Each tire 14 is positioned upon a corresponding wheel of a vehicle. A spare tire 14E may also be included on a vehicle, and may be equipped with a pressure sensor module 16E as well as an antenna 18E. While five tires are illustrated herein, it should be noted that the number of tires may be increased or decreased. For example, a truck having dual wheels at one or several locations may have more tires than described in the present example. Further, although the present disclosure is made in the context of tire pressure sensors, it should be noted that some or all aspect of the following disclosure and claims may have applicability in other contexts, e.g., to other vehicle sensors, or even to sensors in environments other than a vehicle.

A controller 22 has a memory 26 associated therewith. Memory 26 may include various types of memory including but not limited to ROM or RAM. Memory 26 is illustrated as a separate component. However, controller 22 could have memory 26 incorporated therein. Memory 26 stores various thresholds, calibrations, tire characteristics, wheel characteristics, serial numbers, conversion factors, temperature probes, spare tire operating parameters, and other values needed in the calculation, calibration and operation of the system 12. For example, memory 26 may contain a pareto chart or table that includes a sensor identification. Also, warning statuses of each of the tires 14 may be stored within the memory 26.

Controller 22 is generally coupled to a receiver 28, which, like memory 26, may alternatively be incorporated into the controller 22. Receiver 28 has an antenna 30 associated therewith. Receiver 30 receives pressure and other various data from tire pressure circuits 16A-16E. Controller 22 is also coupled to a plurality of sensors, including but not limited to, barometric pressure sensor 32, an ambient temperature sensor 34, a distance sensor 36, a speed sensor 38, a brake pedal sensor 41, and an ignition sensor 42. Button 50 is used to input information or to reset the controller 22.

A telemetric system 46 may be used to communicate information to and from a central location on a vehicle. For example, the control location may keep track of service intervals and use information to inform the vehicle operator service is required.

A counter 48 is used in the tire pressure monitoring system 12. The counter 48 counts the number of times a particular action is performed. For example, counter 48 may be used to count the number of key-off to key-on transitions for the ignition. Further, it should be noted that the counting function may be included in controller 22. Moreover, the counter 48 may count transmissions, i.e., the number of times a sensor transmits.

Figure 2:
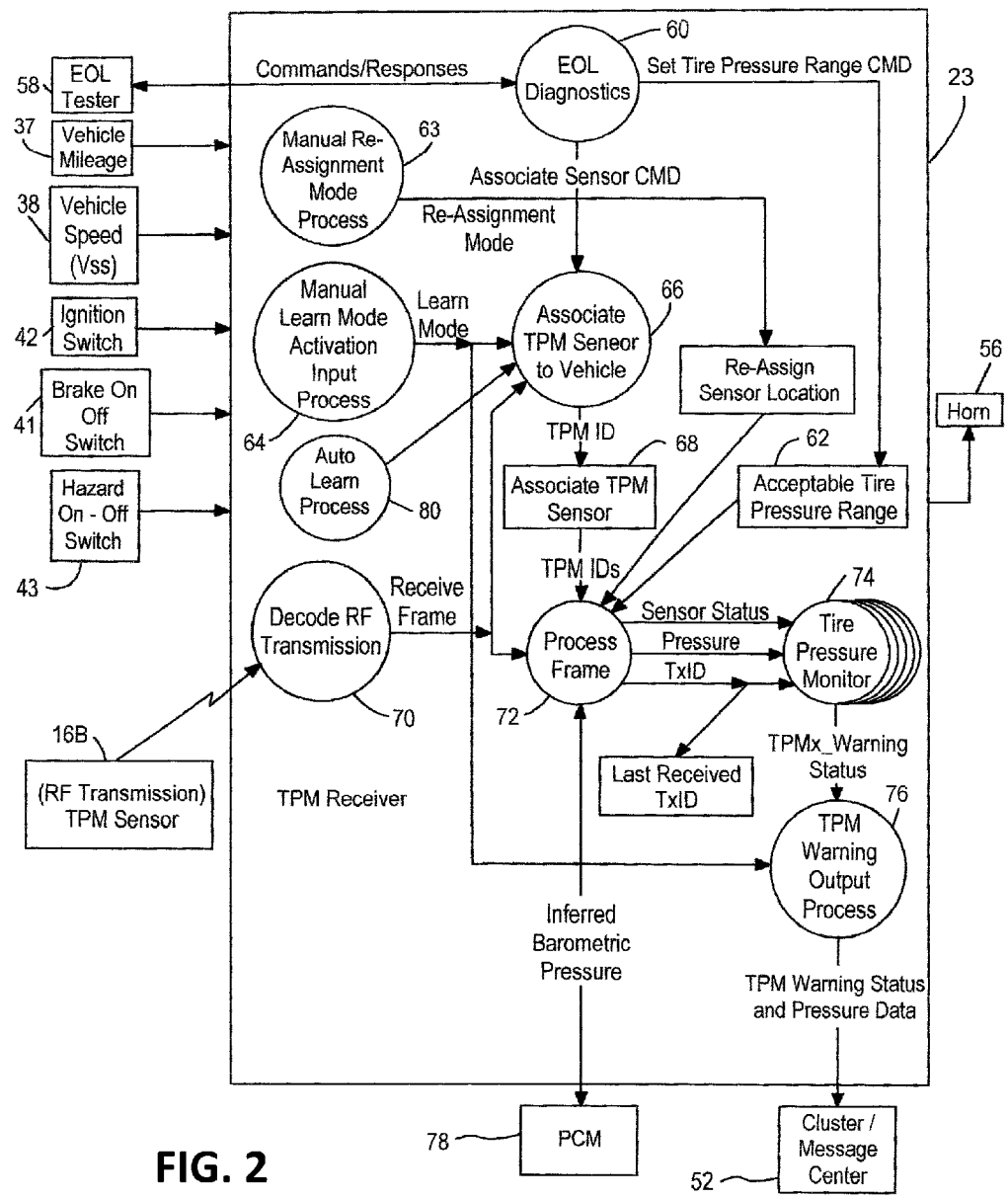
FIG. 2 is a programmatic flowchart of an exemplary tire pressure monitoring system.

Referring now to FIG. 2, exemplary programmatic blocks or modules 23 of the controller 22 and/or receiver 28 are illustrated. Memory 26 stores various ranges for sensor values and thresholds. An end-of-line (EOL) diagnostic block 60 receives test functions from an end-of-line (EOL) tester 58 and provides acceptable pressure ranges 62 and other diagnostic functions to determine faults within the system. The end-of-line tester 58 may also be used in a manufacturing process to store information in memory such as thresholds, tire characteristics, and to initially program the locations corresponding to the vehicle tires. Sensors may include vehicle mileage 37, vehicle speed 38, brake on/off 41, ignition switch 42 and hazard on/off 43.

The sensors 37, 38, 41, 42 and 43 are coupled to a manual reassignment mode process block 63 that allows sensor locations to be reassigned according to use input, and to a manual learn mode activation input process block 64 that allows association block 66 to associate sensors with components to be sensed, e.g., the tire pressure sensors 16 to the locations of respective tires 14 on the vehicle in memory block 68. Transmissions from sensors are decoded in decode block 70, which function may be performed in the receiver 28 or controller 22. The decoded information is also provided to the association block 66 and to process block 72, which processes the information such as ranges, locations, and current transmission process. In the processing block 72, the sensor status pressure and transmission identifier may be linked to a tire pressure monitor block 74 which is used to provide a warning status to an output block 76. Output block 76 provides information to an external controller 78 as well as an indicator at a cluster/message center 52.

Auto learn block 80 may be used to associate the various tire pressure sensor monitors 16 with locations of the tires 14. The block 80 may replace or be used in addition to the manual learn block 64, and will be described in detail later herein with reference to FIG. 5, and is used in conjunction with sensors 16 described herein with reference to FIG. 3.

Figure 3:
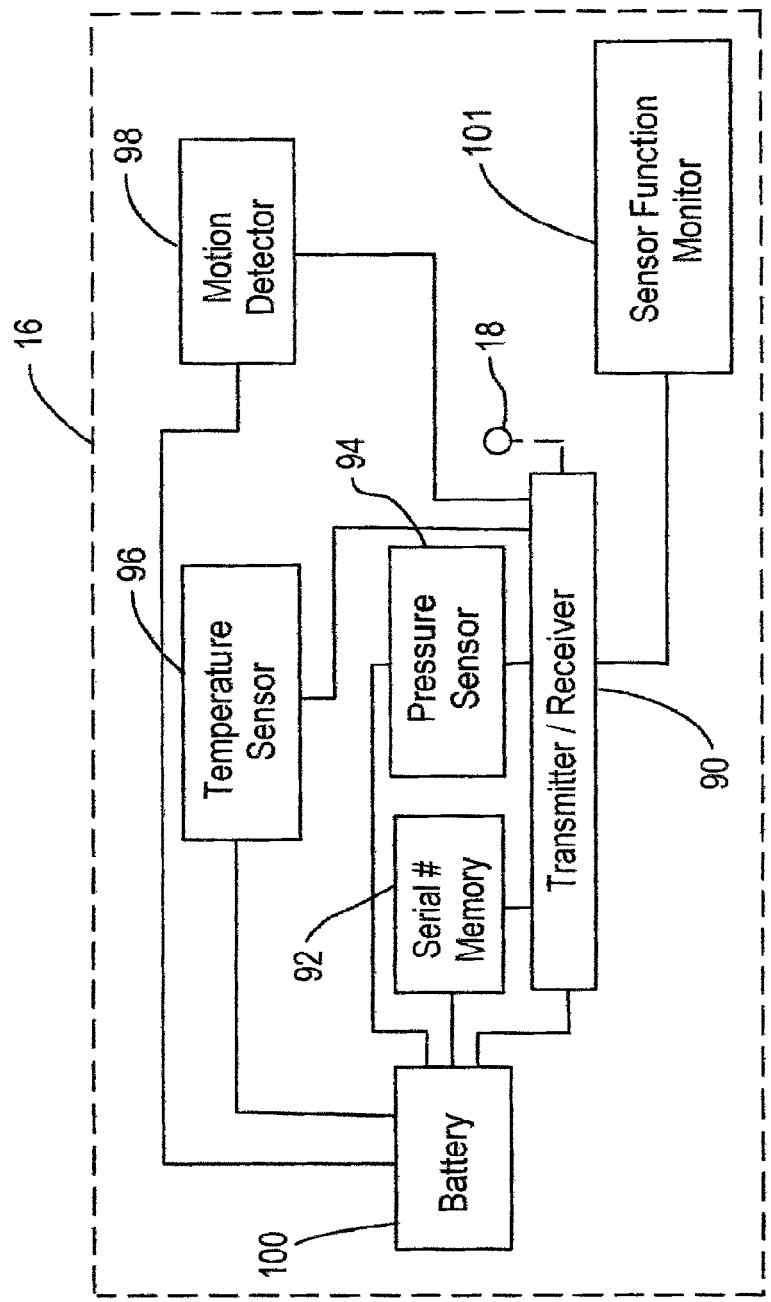
FIG. 3 is a block diagram of an exemplary pressure transmitter.

Referring to FIG. 3, an exemplary tire pressure sensor module 16 is shown. A transmitter/receiver, or transceiver 90, is coupled to the antenna 18 and may selectively transmit information to the receiver 28 (not shown in FIG. 3). The pressure sensor may have a serial number memory 92, a pressure sensor 94 for determining the pressure within the tire 14, a temperature sensor 96, and a motion detector 98 for activating the pressure sensing system.

The transceiver 90, serial number memory 92, pressure sensor 94, temperature sensor 96 and motion sensor 98 are usually coupled to a battery 100. Battery 100 may be a long-life battery capable of lasting through the life of a tire 14. A sensor function monitor 101 generates an error signal when various portions of the tire pressure circuit are not operating or are operating incorrectly. Sensor function monitor 101 may also generate a signal indicating the system is operating normally.

The transceiver 90 is generally capable of transmitting in at least a rotating mode, a stationary mode, or an interim mode. Further, the sensor 16 is configurable and may be implemented to transmit, as required, in burst mode. For example, as soon as the sensor enters the rotating mode, i.e., motion is detected and the rotating mode bit is set to "1", the sensor 16 enters burst mode. The rotating mode bit is contained in the status bits 110 (see FIG. 4). The burst mode is used by the auto-learn block in order to automatically associate a newly installed sensor 16 with the receiver and is monitored by counts. Advantageously, instead of transmitting a series of identical frames in a burst mode transmission, a sensor 16 may be configured to transmit a series of frames having a data field 108 (see FIG. 4) used variously in some frames, for sensor data, e.g., temperature data, and also, in other frames, for a burst mode counter.

The sensor 16 remains in burst mode until a predetermined condition has occurred. For example, if the sensor has transmitted a predetermined number, e.g., thirty-six, of transmissions in the burst mode (in this example, the counter starts at zero and ends at thirty-five), the sensor may exit burst mode and proceed to a rotating or stationary mode depending on motion detection and other information available to the sensor 16. If the sensor 16 has not completed the predetermined number of transmissions, and the sensor 16 has stopped rotating, the sensor will proceed to an interim mode. Burst transmission is suspended in the interim mode. In the event the sensor starts rotating again before a period set for the interim mode expires, the burst mode will continue from the point it stopped until the predetermined number of transmissions is met. In the event the period for the interim mode expires before the sensor resumes rotation, the burst transmission counter is reset. After the burst transmission counter reaches the predetermined number, the sensor may restart the transmission bursting only if the sensor enters the rotating mode from a stationary mode and not from an interim mode.

Figure 4:
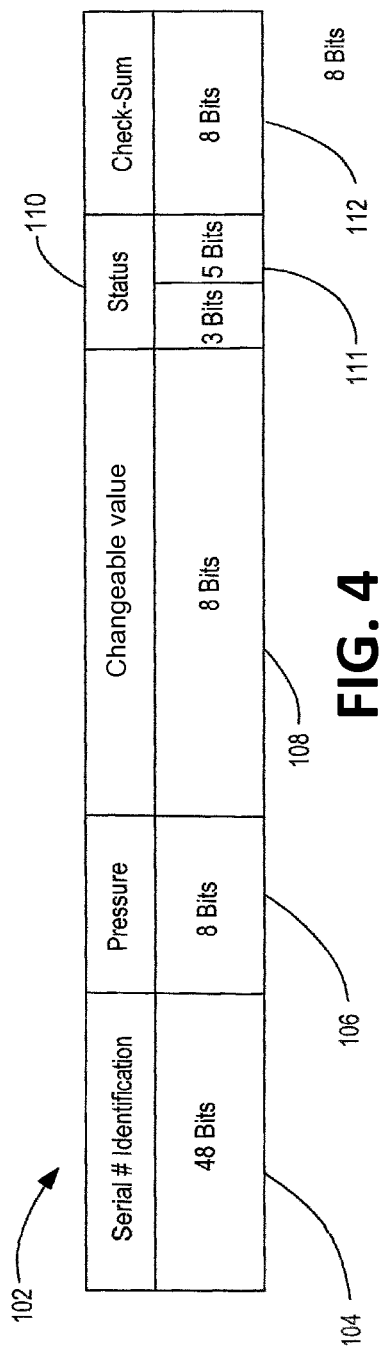
FIG. 4 is diagram of an exemplary digital frame from a pressure transmitter.

Referring now to FIG. 4, an exemplary frame 102, such as may be generated by the tire pressure sensor module 16 of FIG. 3, is shown. The frame 102 may include a sensor identifier (ID) 104 such as a transmitter identification serial number portion, and a data portion 105 in a predetermined format.

That is, the data portion 105 of the frame 102 generally includes a predetermined number of bits, where bits in various positions are dedicated to providing predetermined categories of data. For example, the data portion 105 may include a pressure 106, a changeable value 108, a sensor status 110, a check-sum value 112, etc. In the sensor status 110, a predetermined number of bits, i.e., five, may be dedicated to a factory true setting 111. The other three bits may be used for various information, e.g., Battery Status, Motion Status, Pressure Range.

The changeable value 108 may be used to convey different types of data in different frames 102. For example, in some frames 102, the changeable value 108 may be used to transmit temperature data generated by the sensor 16, whereas in other frames 102, the changeable value 108 may be used to transmit data that is not sensor data, e.g., a burst counter value. Further, when an auto-learn operation is complete, there is no further reason to transmit a burst counter value at all, and the changeable value 108 may then be used solely to transmit sensor data such as temperature data.

A motion detector (not shown in FIG. 4) may initiate transmission of frame 102 to the transceiver 90 (also not shown in FIG. 4). Accordingly, during an auto learn procedure, the changeable value 108 may be used for a counter value in some frames 102, while being used for other data, e.g., temperature data, in other frames transmitted during the auto learn procedure. In general, a packet may be defined as includes a predetermined number of frames, i.e., "X" frames, along with X number of spaces between frames 102. In one example, X=4. In this example (assuming that counting starts at zero, and hence the example includes frames 102 numbered 0, 1, 2, and 3), frames 102 numbered 0, 1, and 2 could include temperature data in changeable value 108, while a frame 102 numbered 3 could include a burst counter data value.

The counter value is zero with the two most significant bits set to "ones" for the first transmission. The counter is then increased to the predetermined number of transmissions, with the two most significant bits set to "ones". For example, for 8 bits, when the counter is zero, the sensor transmits "1100 0000" as the burst mode transmission counter value. When the counter value is at its predetermined maximum, e.g., thirty-six transmissions, the counter value is thirty-five and the sensor transmits "1110 0011" as the burst mode transmission counter value.

Figure 5:
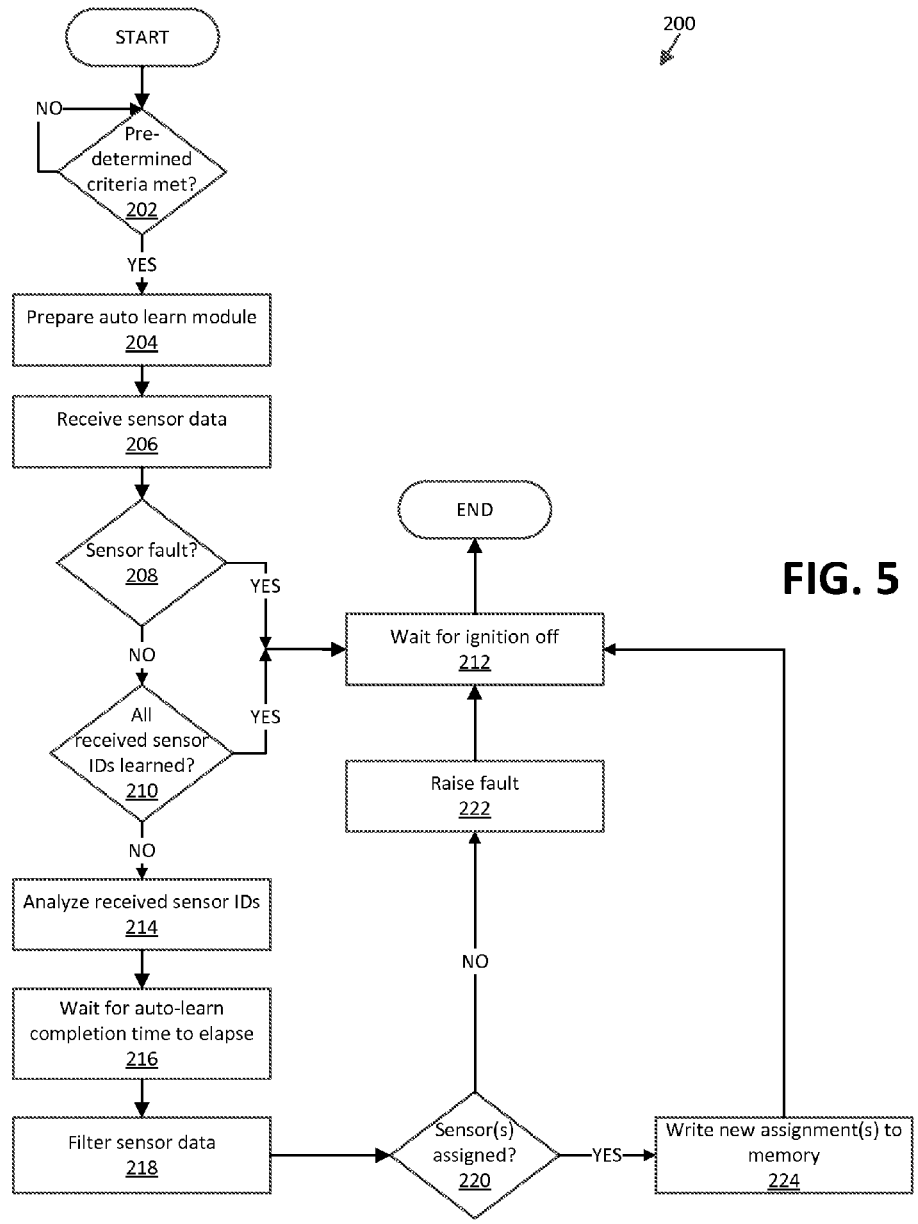
FIG. 5 is logic flow diagram of an auto learn function of the inventive subject matter.

FIG. 5 illustrates an exemplary process 200 used to perform an auto learn operation. For example, the process 200 may be carried out according to instructions stored in a memory, e.g., memory 26, and executed by a processor, e.g., a processor of controller 22.

Thus, the process 200 may begin in a step 202 when the controller 22 is powered on and/or boots up. Operations performed in the step 202 are generally a prerequisite to the auto learn operation being initiated. That is, the controller 22 may include instructions for detecting if various conditions have been met for the auto learn operation to be performed. For example, such conditions may include whether a vehicle ignition is active, whether a vehicle speed is greater than a predetermined threshold value, and/or whether a value provided by vehicle motion timer. If the controller 22 determines that the predetermined conditions are met, then the process 200 proceeds to step 204; otherwise, the process 200 remains in step 202.

In step 204, upon conditions evaluated in step 202 being determined to be true, an auto learn module is prepared for activation. For example, in one implementation, an auto learn status bit is set to null, a tire pressure monitor streaming mode is set to "true," and a data table or other data structure containing potential sensor identification numbers is initialized.

Next, in step 206, the receiver 28 receives data from one or more sensors 16. Such data may be in the form of frames 102 included in data packets as described above with respect to FIG. 4. When sensor 16 data is received, controller 22 may then detect a sensor ID 104 that is associated with other data in the frame. Further, the controller 22 may determine whether a frame 102 has a predetermined position in a series of frames 102, e.g., is the last frame in a packet of frames 102, thereby determining whether the changeable value 108 in the data portion 105 of a frame 102 includes data reflecting conditions sensed by a sensor 16, e.g., temperature, or a burst counter value. Sensor 16 data such as temperature may be stored by the controller 22, e.g., in memory 26, for further use in association with a respective sensor ID 104. Further, a burst counter value may be stored in association with the sensor ID 104, and further may be used to associate a sensor ID 104 with a sensor 16 as described herein.

Next, in step 208, it is determined whether any sensor status, i.e., as indicated in the status field 110 of a frame 102, is at a fault setting. If yes, step 212 is executed next. Otherwise, the process 200 proceeds to step 210.

In step 210, the controller 22 retrieves from the memory 26 a list of sensors 16, and their respective sensor IDs 104, that have previously been learned. It should be noted that the number of ID's monitored in the present example is four. However, this number is configurable and may depend on the number of tires on the vehicle, either in-use or stored as spare. In any case, every sensor 16 from which data is received as described with respect to step 206 is included in the list retrieved from the memory 26 as having been previously learned, i.e., all received sensor IDs 104 are matched to sensor IDs 104 in the list retrieved from the memory 26, and also if the rotating mode bit is set to 1, then the auto learn status is confirmed, the streaming mode is set to "false", and step 212 is executed next. When the process 200 transitions from step 210 to step 212, this means that every sensor 16 ID stored in memory has been identified and confirmed. Otherwise, the process 200 proceeds to step 214.

In step 212, which may follow either step 208 or 210 or, as described below, step 222, the process 200 waits for an ignition off signal. Where step 212 follows step 210, the ignition "off" signal is confirmation that the sensor 16 IDs have all been associated with respective tires 14, and in any case the ignition off signal means that no further action is required by the process 200. Accordingly, the process 200 ends following step 212.

In step 214, received sensor 16 data is analyzed in a manner to support association of sensor IDs 104 with particular sensors 16, e.g., with sensors 16 associated with particular tires 14. For example, a pareto, or sorted histogram, such as described further below, may be created 210 of all received sensor identifications, e.g., sensor IDs 104, from frames 102 transmitted from the sensors 16, e.g., to the receiver 28.

Next, in step 216, the controller 22 determines whether, since the initiation of the process 200, e.g., since the receiver 28 began receiving sensor 16 data as described above with respect to step 206, an amount of elapsed time exceeds a predetermined value for an auto learn completion timer. Considerations in establishing the auto-learn completion time may include, for example, a number of competing foreign sensors, e.g., sensors in other vehicles, likely to be present or nearby.

Next, in step 218, the controller 22 processes the sensor 16 data analyzed as described above with respect to step 514. For example, where a pareto of received sensor IDs 104 is created, the pareto may be filtered into a pareto of potential sensor IDs for association to particular sensors 16. Potential sensor IDs 104 may be determined according to various parameters. For example, sensor 16 identification parameters could include a burst counter minimum value parameter B1, a burst counter comparison to learned ID parameter B2, and a burst counter missing sensors parameter B3. Such parameters are used in the auto learn operation to evaluate the potential sensor IDs 104 and establish sensor 16 assignments. In one exemplary implementation, B1 is a value of the six least significant bits of 8 changeable value 108 data bits when the sensor burst mode is set to true; B2 is a set of predetermined values, each of the values representative of a burst counter value associated with a previously learned ID 104 stored in the memory 26 as described above; and B3 is a predetermined burst counter value representative of the case in which no sensor IDs are stored in the memory 26. Considerations in establishing the parameter B3 may include a vehicle's reception rate of sensor data.

Next, in step 220, the controller 22 determines whether all received sensor IDs 104 can be associated with sensors 16. If not, the process 200 proceeds to step 222; otherwise, step 224 is performed next.

In one exemplary implementation, the determination of step 220 is performed as follows. The sensor IDs 104 associated with the greatest number of frames 102 received are compared to the burst counter minimum value requirement B1. For example, potential ID1 will be the sensor ID with the highest number of frames 102 received, potential ID2 will be the sensor ID with the second highest number of frames 102 received, potential ID3 will be the sensor ID with the third highest number of frames 102 received, and potential ID4 will be the sensor ID with the fourth highest number of frames 102 received.

Then, the burst counters of any potential IDs 104 are checked against B2, the burst counters of sensors already associated with the vehicle and stored in non-volatile memory. This step ensures that any newly received sensor ID's are within the B2 counts of sensors that are already on the vehicle and helps protect against incorrectly identifying sensors on another vehicle, such as one located near a subject vehicle. In yet another check that avoids incorrectly identifying sensors of another vehicle is a check that is performed on the status "factory true" setting. This setting is transmitted during the first few drive cycles, such as the first sixteen drive cycles, and may be used to rank the potential IDs 104.

If one or more (up to three in an exemplary implementation) of the learned IDs 104 in non-volatile memory 26 have been received, then the burst counter of new potential IDs 104 is compared to an average of burst counter values for each of the received IDs 104. Establishing this value ensures a relevant burst counter comparison for any new potential ID's. If none of the learned IDs in non-volatile memory has been received, then the burst counter of new potential IDs is compared against the predetermined value for the burst counter comparison requirement for all sensors missing, i.e., the parameter B3. Further, if the number of potential IDs 104 received is greater than the number of missing learned sensor ID's, then the normal factory true bit setting, 111 in FIG. 4, is used to rank the relevance of the potential sensor IDs 104.

Assignments of sensor IDs 104 to sensors 16, e.g., to tire 14 locations including a sensor 16 associated with a particular sensor ID 104, are stored in the memory 26. Various manners of storing new sensor IDs 104 in the memory 26 may depend upon how many received sensor IDs 104 are associated with IDs 104 previously stored in the memory 26, e.g., that were retrieved as described above regarding step 210.

For example, in an implementation having four sensors 16, assume that all four sensor IDs previously stored in non-volatile memory 26 have not been received as described above with respect to step 206, and that four potential sensor IDs 104 exist in the filtered pareto described above concerning step 218. In this possibility each potential ID 104 is assigned to a sensor 16 and stored in non-volatile memory 26 in step 224. Further, auto learn status is confirmed and any faults, warnings, etc. for each of the four tire locations are cleared.

In another possibility, less than all the sensor IDs previously stored in non-volatile memory 26 have been received as described with respect to step 206. Any missing sensor IDs 104 are assigned to sensors 16 that do not have sensor IDs 104 assigned thereto, and the new ID assignments are and stored in non-volatile memory 26 in step 224.

Further, in the event no sensor IDs 104 can be associated with a sensor 16, the process 200 proceeds from step 220 to step 222, in which an auto learn status fault is set. The process 200 then proceeds from step 222 to step 212.

Computing devices such as those discussed herein, e.g., the controller 22, generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, html, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
receiving frames of data, wherein each frame includes at least a sensor identifier and a changeable data field and is sent from one of a plurality of sensors, whereby each of the plurality of sensors is associated with a respective one of a plurality of sensor identifiers, and wherein the changeable data field includes, in some of the frames, data representing a sensed condition and, in others of the frames, counter data; wherein the changeable data field includes the counter data only during an auto-learn operation, and includes only data representing a sensed condition after the auto-learn operation is terminated; and
analyzing the counter data to determine whether any of the sensor identifiers can be associated with one of a plurality of sensor locations.

2. The method of claim 1, wherein the data representing the sensed condition is temperature data.

3. The method of claim 1, further comprising storing an assignment of one of the sensor identifiers to one of the sensor locations.

4. The method of claim 1, further comprising raising a fault condition on determining that no sensor identifiers can be associated with one of a plurality of sensor locations.

5. The method of claim 1, wherein analyzing the counter data includes generating a pareto of the counter data.

6. The method of claim 1, wherein the sensors are included in a vehicle tire pressure monitoring system.

7. A computing device, comprising a processor and a memory, the memory including instructions executable by the processor for:
receiving frames of data, wherein each frame includes at least a sensor identifier and a changeable data field and is sent from one of a plurality of sensors, whereby each of the plurality of sensors is associated with a respective one of a plurality of sensor identifiers, and wherein the changeable data field includes, in some of the frames, data representing a sensed condition and, in others of the frames, counter data; wherein the changeable data field includes the counter data only during an auto-learn operation, and includes only data representing a sensed condition after the auto-learn operation is terminated; and analyzing the counter data to determine whether any of the sensor identifiers can be associated with one of a plurality of sensor locations.

8. The device of claim 7, wherein the data representing the sensed condition is temperature data.

9. The device of claim 7, the instructions further comprising instructions for storing an assignment of one of the sensor identifiers to one of the sensor locations.

10. The device of claim 7, the instructions further comprising instructions for raising a fault condition on determining that no sensor identifiers can be associated with one of a plurality of sensor locations.

11. The device of claim 7, wherein analyzing the counter data includes generating a pareto of the counter data.

12. The device of claim 7, wherein the sensors are included in a vehicle tire pressure monitoring system.

13. The device of claim 7, wherein the device is a controller in a vehicle.

14. A non-transitory computer-readable medium including thereon instructions executable by a processor, the instructions comprising instructions for:

receiving frames of data, wherein each frame includes at least a sensor identifier and a changeable data field and is sent from one of a plurality of sensors, whereby each of the plurality of sensors is associated with a respective one of a plurality of sensor identifiers, and wherein the changeable data field includes, in some of the frames, data representing a sensed condition and, in others of the frames, counter data; wherein the changeable data field includes the counter data only during an auto-learn operation, and includes only data representing a sensed condition after the auto-learn operation is terminated; and analyzing the counter data to determine whether any of the sensor identifiers can be associated with one of a plurality of sensor locations.

15. The medium of claim 14, the instructions further comprising instructions for storing an assignment of one of the sensor identifiers to one of the sensor locations.

16. The medium of claim 14, wherein analyzing the counter data includes generating a pareto of the counter data.

17. The medium of claim 14, wherein the sensors are included in a vehicle tire pressure monitoring system.

* * * * *